United States Patent [19]
Suzuki et al.

[11] Patent Number: 6,035,955
[45] Date of Patent: Mar. 14, 2000

[54] ENGINE COMPARTMENT STRUCTURE OF A VEHICLE FOR INTRODUCING COOL INTAKE AIR

[75] Inventors: Makoto Suzuki; Shizuo Abe, both of Mishima, Japan

[73] Assignee: Toyota Jidosha Kabushiki Kaisha, Toyota, Japan

[21] Appl. No.: 08/626,758

[22] Filed: Apr. 2, 1996

[30] Foreign Application Priority Data

Aug. 25, 1995 [JP] Japan ................................. 7-217821

[51] Int. Cl.⁷ .......................... B60K 11/04; B60K 11/06
[52] U.S. Cl. ................................. 180/68.1; 180/68.4
[58] Field of Search .................. 180/68.1, 68.3, 180/68.2, 68.4

[56] References Cited

U.S. PATENT DOCUMENTS

| | | | |
|---|---|---|---|
| 2,197,503 | 4/1940 | Martin | 123/119 |
| 3,885,888 | 5/1975 | Warhol | 416/175 |
| 4,114,714 | 9/1978 | Fachbach et al. | |
| 4,173,995 | 11/1979 | Beck | 165/51 |
| 4,186,693 | 2/1980 | Thien et al. | |
| 4,222,710 | 9/1980 | Katagiri et al. | 416/236 A |
| 4,340,123 | 7/1982 | Fujikawa | |
| 4,516,650 | 5/1985 | Yamaguchi et al. | 180/68.3 |
| 4,610,326 | 9/1986 | Kirchweger et al. | 280/68.1 |
| 4,979,584 | 12/1990 | Charles | 180/68.1 |
| 4,995,447 | 2/1991 | Weidmann et al. | 165/44 |
| 5,143,516 | 9/1992 | Christensen | 415/182.1 |
| 5,427,502 | 6/1995 | Hudson | 415/211.1 |
| 5,551,505 | 9/1996 | Freeland | 165/41 |
| 5,689,953 | 11/1997 | Yamashita et al. | 60/316 |

FOREIGN PATENT DOCUMENTS

| | | |
|---|---|---|
| 5-1634 | 1/1993 | Japan . |
| 5-155256 | 6/1993 | Japan . |

OTHER PUBLICATIONS

English–language Abstract of JP–A–1634, Jan. 1993, p. 55 M 1415.

S. Abe et al., "Three Dimensional Numerical Analysis of Engine Compartment Flow", *SAE Paper No. 9535314*, May 1995, pp. 223–226.

Primary Examiner—Lanna Mai
Assistant Examiner—Bridget Avery
Attorney, Agent, or Firm—Oliff & Berridge, PLC

[57] ABSTRACT

An engine compartment structure of a vehicle for introducing cool air into an air intake port without a baffle plate is provided. The structure is constructed such that an air intake port is located behind a first headlamp in the engine compartment, the opening of the air intake port is directed toward the front of the compartment, and the rotational direction of cooling fans for the radiator is determined such that the air discharged by the one or more radiator cooling fans is directed away from the location of the intake air port of the engine, and towards a side behind a second headlamp which is opposite to the first headlamp in the engine compartment.

16 Claims, 8 Drawing Sheets

AXIAL COMPONENT

ROTATIONAL COMPONENT

Fig.11A
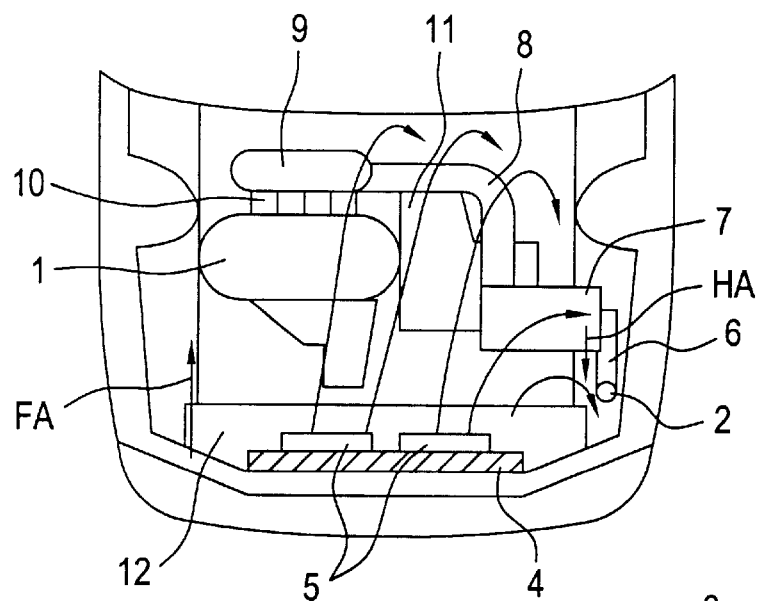
Fig.11B
Fig.11C
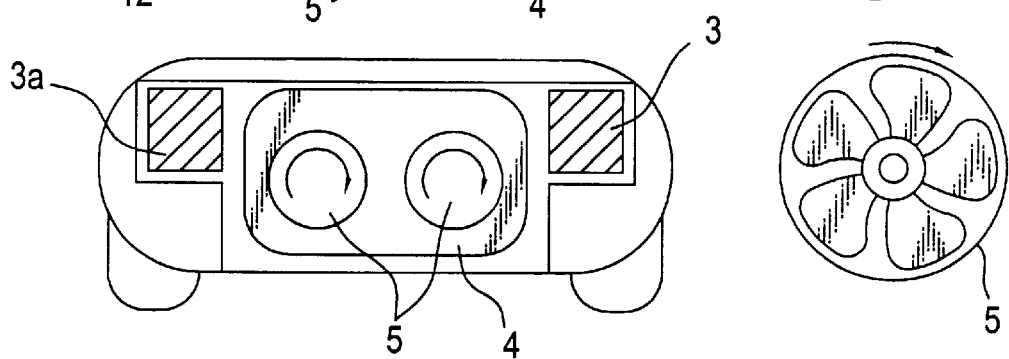
PRIOR ART

Fig. 12A
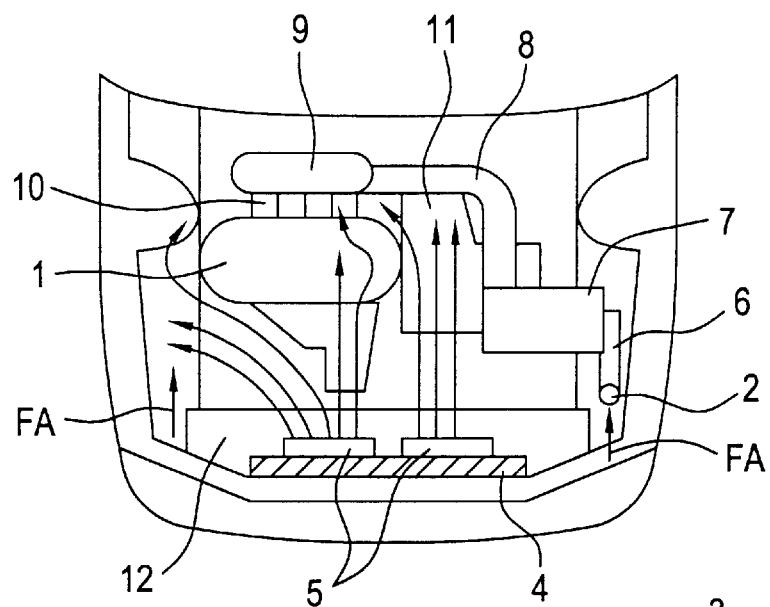
Fig. 12B
Fig. 12C
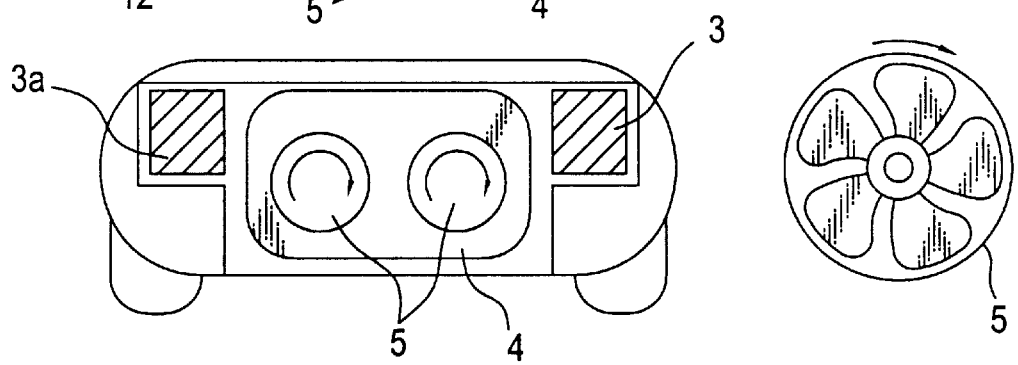
PRIOR ART

ENGINE COMPARTMENT STRUCTURE OF A VEHICLE FOR INTRODUCING COOL INTAKE AIR

BACKGROUND OF THE INVENTION

1. Field of the Invention

The present invention relates to an engine compartment structure of a vehicle for introducing cool air into an intake air system of the engine.

2. Description of the Related Art

Recently, it has been required to supply a large amount of oxygen to engine combustion chambers as higher power performance is required for automotive engines. However, intake air in an engine is heated in the engine compartment and the temperature of the air rises before the air is sucked into the combustion chambers. When the temperature of the intake air introduced into the chambers rises, the air density is reduced, the weight of the oxygen in the intake air is reduced, and the air filling efficiency of the chambers is also reduced. Thus, the engine power is reduced and engine knocking occurs.

FIG. 11A is a plan view showing an engine compartment structure of a vehicle for introducing cool air into an intake air system of the engine according to prior art and FIG. 11B is an enlarged view showing one of cooling fans mounted on a radiator shown in FIG. 11A. In FIG. 11A, an air intake port 2 of a combustion engine 1 is located behind a first headlamp 3 in the engine compartment. Two cooling fans 5 are mounted on a rear side of a radiator 4, and the cooling fans rotate counterclockwise when they are seen from the engine side. The intake air flowing into the air intake port 2 is sucked into combustion chambers of the engine 1 via an intake duct 6, an air cleaner 7, an intake pipe 8, a surge tank 9 and an intake manifold 10, in that order. A transmission 11 is provided on the right side of the engine 1 when it is seen from a front side of the vehicle. Above the transmission 11, there is a space, as the height of the transmission 11 is lower than that of the engine block 1. The radiator 4 is covered with an under cover 12. In such an engine compartment structure for introducing cool air into the intake air system of the engine as explained above, fresh air FA flows into the engine compartment from outside after passing through a space behind a second headlamp 3a located opposite to the first headlamp 3. On the other hand, heated air HA after passing through the radiator cooling fans 5 turns around toward the air intake port 2, which raises the temperature of the intake air. This results in reduced air filling efficiency to the combustion chambers of the engine.

As an invention to solve the above problem, a structure that restricts temperature increases of the air introduced into an intake air system of an engine is disclosed in Japanese Unexamined Patent Publication No. 5-1634. According to the structure, the temperature of the air introduced into the intake air system from outside decreases, so that the air filling efficiency to the combustion chambers of the engine can be improved. To accomplish this, a baffle plate is provided in the structure in such a way as to extend a fan shroud of a radiator toward the rear of a car body and to intentionally open an air intake port of an intake duct toward the opposite side of the radiator, thereby preventing heated back wind passing through the radiator cooling fans from being introduced into the intake air system of the engine.

However, according to the engine compartment structure for a vehicle that restricts temperature increases of the air introduced into the intake air system of the engine disclosed in Japanese Unexamined Patent Publication No. 5-1634, a baffle plate must be provided, therefore additional expenses for the baffle plate and for the man hours for assembling the baffle plate are required.

SUMMARY OF THE INVENTION

The present invention has been made in view of the foregoing problems and it is therefore an object of the present invention to provide an engine compartment structure of a vehicle for introducing cool air into an intake air system of the engine that prevents the heated back wind passing through one or more radiator cooling fans from being introduced into the intake air system of the engine without requiring a baffle plate.

In order to accomplish the above object, the inventors of the present invention researched the effect of the back wind of radiator cooling fans on an air introduced into an intake air system of an engine. In the prior art, only an axial component of flow velocity behind the cooling fans for the radiator was taken into consideration for analyzing the effect. However, the inventors considered a rotational component, as well as the axial component, of flow velocity behind the cooling fans for the radiator when analyzing the effect. As a result of their research, the inventors discovered that passage of the back wind of the radiator cooling fans and temperature distribution in the engine compartment are both influenced by the rotational direction of the cooling fans, which determines the rotational component of flow velocity behind the cooling fans for the radiator. Thus, the inventors determined that cool air can be introduced into the air intake port if the rotational direction is determined so that passage of the back wind of the radiator cooling fans is not directed toward the air intake port of the engine, and the inventors experimentally confirmed this.

In order to accomplish the object of the present invention, the structure of the present invention is characterized in that an air intake port is located behind a first headlamp in the engine compartment, an opening of the air intake port is directed toward the front of the compartment, and a rotational direction of one or more cooling fans for the radiator is determined such that the air discharged by the one or more cooling fans is directed away from the location of the air intake port of the engine, and towards a side behind a second headlamp which is opposite to the first headlamp in the engine compartment.

More specifically, the air intake port is arranged on the front corner of the left side of the engine compartment if the rotational direction of the cooling fans for the radiator is clockwise, when they are seen from the engine side, and is arranged on the front corner of the right side in the engine compartment if the rotational direction of the cooling fans for the radiator is counterclockwise, when they are seen from the engine side.

Depending on the rotational direction of the cooling fans for the radiator, the passage of the back wind of the radiator cooling fans, namely, the air discharged by the radiator cooling fans, is directed away from the location of the air intake port of the engine, and fresh air from the front of the engine compartment flows into the opening of the air intake port.

BRIEF DESCRIPTION OF THE DRAWINGS

The present invention will be more clearly understood from the description as set forth below with reference to the accompanying drawings, wherein:

FIG. 11A is a plan view showing an engine compartment structure of a vehicle for introducing cool air into an intake air system of the engine according to the prior art;

FIG. 11B is an enlarged view showing one of the cooling fans mounted on a radiator;

FIG. 11C is a front view showing an engine compartment structure.

FIG. 12A is a view showing air flow in an engine compartment of a vehicle for introducing cool air into an intake air system of the engine according to the prior art when the rotational component of flow velocity behind fan blades of the cooling fans for a radiator is not taken into consideration; and FIG. 12B is an enlarged view showing one of the cooling fans.

FIG. 12C is a front view showing an engine compartment structure.

DESCRIPTION OF THE PREFERRED EMBODIMENTS

Figure 1A:
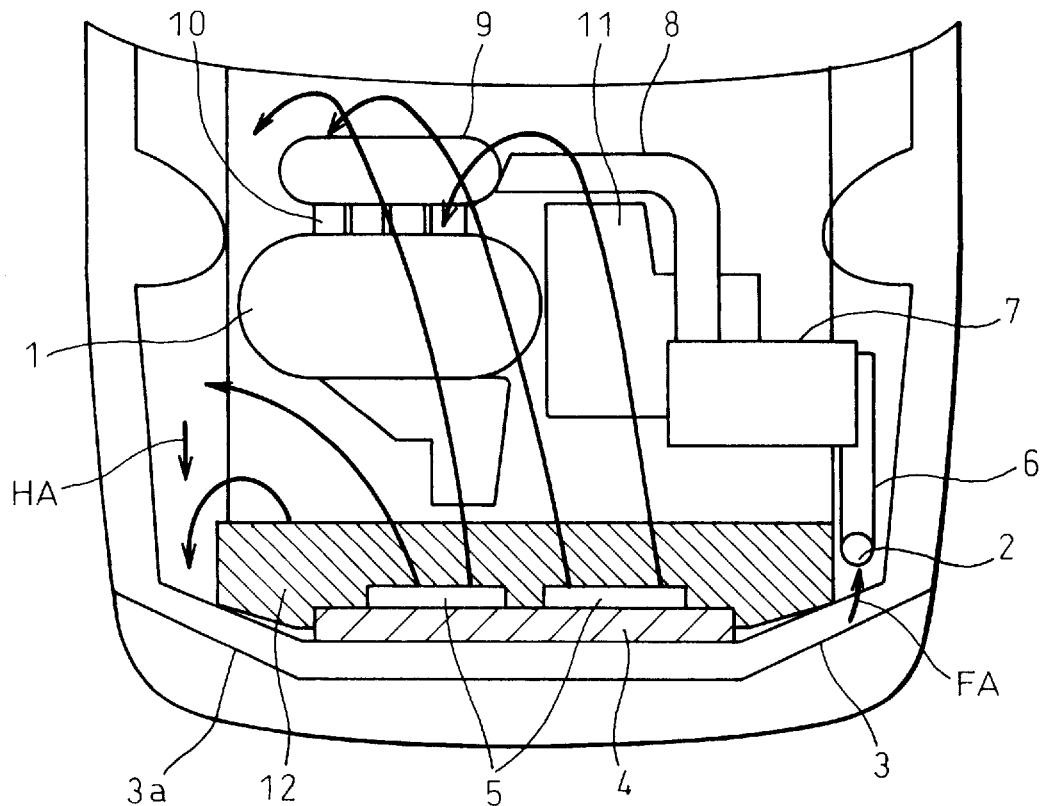
FIG. 1A is a plan view showing an engine compartment structure of a vehicle for introducing cool air into an intake air system of the engine according to the present invention.
Figure 1B:
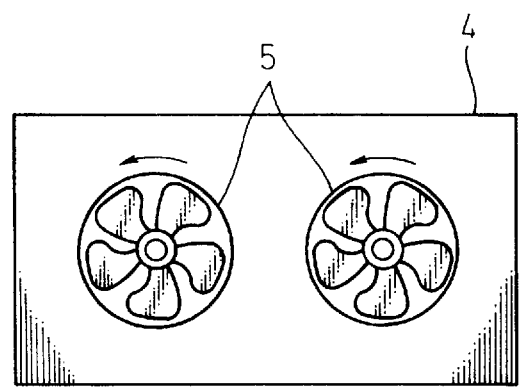
FIG. 1B is a perspective view through a radiator when it is seen from front of a vehicle, which shows rotational directions of cooling fans mounted on the radiator for the ease of understanding.

In all the figures, from FIG. 1A to FIG. 12B, the same reference numerals denote the same parts. FIG. 1A is a plan view showing an engine compartment structure of a vehicle for introducing cool air into an intake air system of the engine according to the present invention. FIG. 1B is a perspective view through a radiator from the front of a vehicle showing the rotational direction of the cooling fans mounted on the radiator for ease of understanding. The engine compartment structure shown in FIGS. 1A and 1B is substantially the same as that shown in FIGS. 11A and 11B except that the rotational direction of the cooling fans 5 for the radiator 4 is different, and that the shape of the blades of the cooling fans 5 are different. When they are seen from the engine side, the rotational direction of the cooling fans 5 shown in FIG. 1A is clockwise, while the rotational direction of the cooling fans 5 shown in FIG. 11A is counterclockwise. The shape of the blades meet with the rotational direction. Hereinafter, the detail of the structure around the air intake port will be explained.

Figure 2:
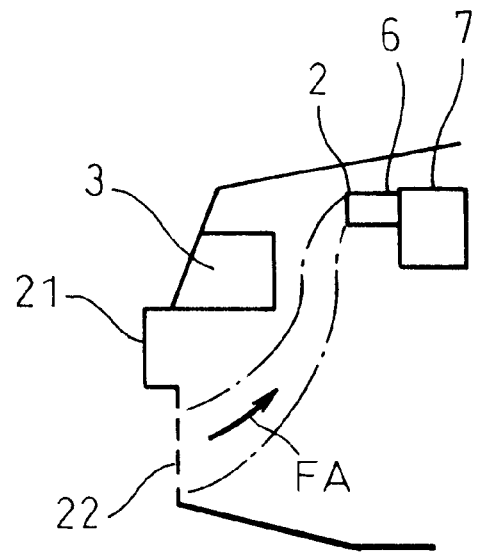
FIG. 2 is a right side view showing an air intake port shown in FIG. 1A.
Figure 3:
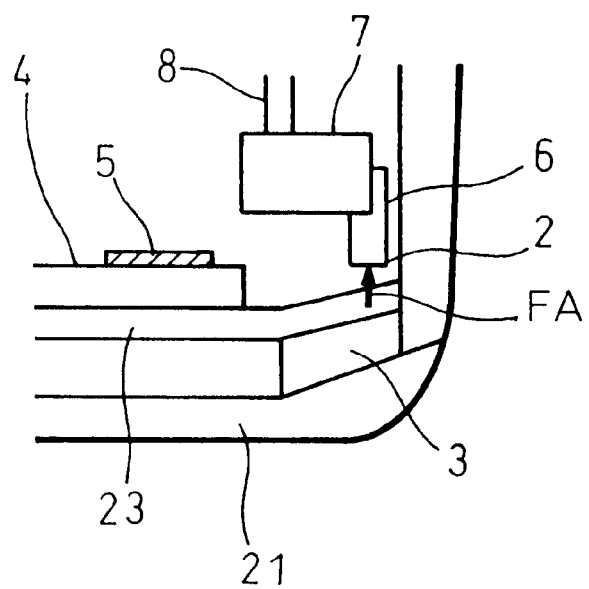
FIG. 3 is a plan view showing an air intake port shown in FIG. 1A.

FIG. 2 is a right side view and FIG. 3 is a plan view, each showing an air intake port shown in FIG. 1A. As shown in FIGS. 1A and 1B, the air intake port 2 of the engine 1 is located behind a first headlamp 3 in the engine compartment. Namely, the air intake port 2 is located behind the headlamp 3 that is on the left side when the lamp 3 is seen from the engine side. And the opening of the air intake port 2 is directed toward front side of the engine compartment. The intake air flowing into the air intake port 2 is introduced into the engine combustion chamber through an intake air duct 6, an air cleaner 7, an intake pipe 8, a surge tank and an intake manifold 10, in that order. In an embodiment of an engine compartment structure of a vehicle for introducing cool air into an intake air system of the engine according to the present invention, fresh air FA flowing into the engine compartment comes into the compartment through openings 22 underneath a bumper 21 under the headlamp 3 and enters into the air intake port 2 located behind the headlamp 3. The air intake port 2 is arranged at a lower position than the height of a radiator support 23 which supports the radiator 4. Heated air HA passing through the cooling fans 5 for the radiator 4 does not turn around into the air intake port 2, but turns around behind the headlamp 3a, even if the engine is idling or operated at low speed. The reason for this will be explained in detail later. Thus, a temperature rise in the intake air can be avoided. Furthermore, the air intake port 2 is arranged behind the headlamp 3 which protects water and snow from entering directly into the air intake port 2. Hereinafter, the details of the effect of back wind from the cooling fans for a radiator on streams of the wind in the engine compartment will be explained. First, the axial component of wind velocity behind the fan blades as a unit will be explained.

Figure 4:
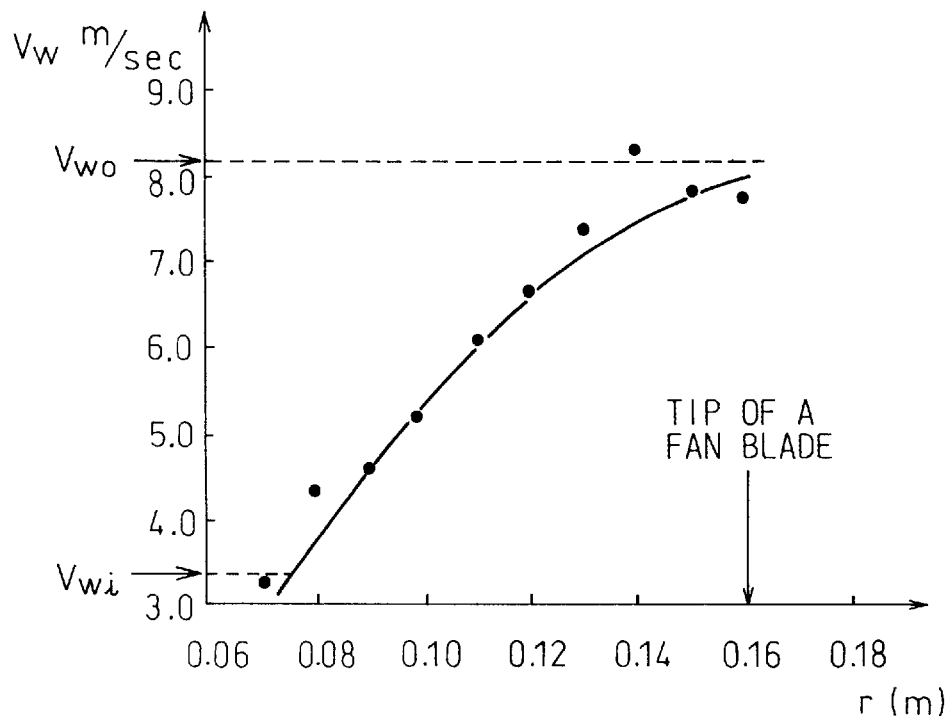
FIG. 4 is a resultant graph showing the axial component of flow velocity behind fan blades for a fan at different locations of the fan blades.

FIG. 4 is a graph showing the axial component of flow velocity behind fan blades for a fan at different locations of the fan blades. In FIG. 4, the abscissa represents the distance r (m) from a center of a rotational axis of the fan blades, and the ordinate represents wind velocity, $V_w$ (m/sec), which is the axial component of flow velocity at positions 10 mm ahead of the blades in the direction of the stream of the back wind of the cooling fans and r (m) apart from the center of the rotational axis of the fan blades. It can be seen that the wind velocity $V_{wo}$ at a position 10 mm ahead of the outer end of the blade is three times as much as the wind velocity $V_{wi}$ at another position 10 mm ahead of the inner end of the blade. Next, the rotational component of wind velocity behind the fan blades as a unit will be explained.

Figure 5:
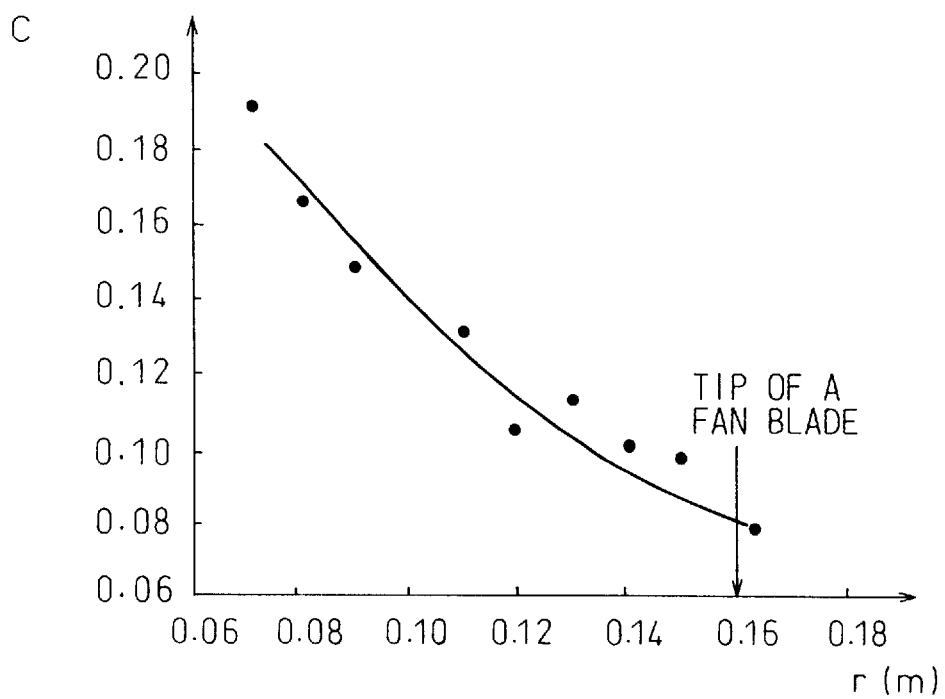
FIG. 5 is a resultant graph showing the rotational component of flow velocity behind fan blades for a fan at different locations of the fan blades.

FIG. 5 is a graph showing the rotational component of flow velocity behind fan blades for a fan at different locations of the fan blades. In FIG. 5, the abscissa represents the distance r (m) from a center of a rotational axis of the fan blades, and the ordinate represents the ratio C that indicates how closely the wind velocity follows to the blade velocity in the tangential direction of the blade. The ratio C is expressed as below.

$$C = V_m / rw$$

Wherein, $V_m$ represents tangential velocity of air, rw represents tangential velocity of the fan blades at the position r (m) apart from the center of the rotational axis. It can be seen from FIG. 5 that the rate C at the inner end of fan blades is 20% while at the outer end of the blades is about 8%. That means that the rate C is inversely proportional to the distance from the center of the rotational axis. Namely, the closer position to the center on the fan blades, the higher the rate C.

Figure 6:
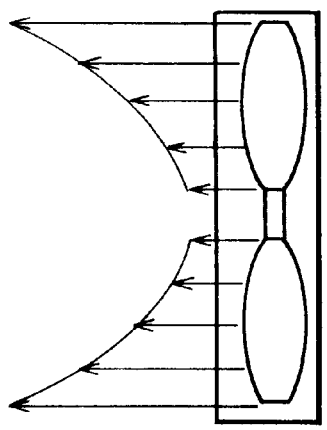
FIG. 6 is an explanatory view showing the axial component of flow velocity behind fan blades.
Figure 7:
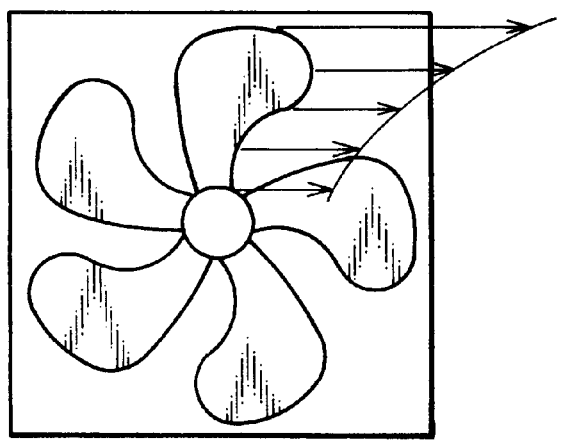
FIG. 7 is an explanatory view showing the rotational component of flow velocity behind fan blades.

According to experimental results, the axial component of the flow velocity behind the fan blades is proportional to the distance r from the center of the rotational axis as exemplified by arrows shown in FIG. 6. The rotational component of flow velocity behind the fan blades is also proportional to the distance from the center of the rotational axis as exemplified by arrows shown in FIG. 7.

In light of the above experimental results, the analysis of air flow in an engine compartment of a vehicle by means of computer simulation was carried out in consideration of the effect of the axial component as well as the rotational component of fan velocity behind the fan blades, on streams of the back wind of the cooling fans. Hereinafter, the results of this analysis will be explained referring to FIGS. 1A, 1B, 11A, 11B, 12A and 12B.

FIG. 12A is a view showing air flow in an engine compartment of a vehicle for introducing cool air into an intake air system of the engine according to the prior art when the axial component of the flow velocity behind the fan blades of cooling fans for a radiator is taken into consideration but the rotational component of flow velocity behind fan blades is not taken into consideration, and FIG. 12B is an enlarged view showing one of cooling fans mounted on a radiator as shown in FIG. 12A.

The arrows in the engine compartments shown in FIGS. 1A, 11A and 12A indicate air flow in the upper space of the engine compartment as determined by the computer simulation. In FIGS. 1A and 11A, both the axial and rotational components of flow velocity behind the fan blades are taken into consideration. The difference between the structures shown in FIG. 1A and FIG. 11A is in that the rotational direction of the fan 5 is the opposite and the shape of the blades of the cooling fans 5 are different.

As can be seen by the arrows shown in FIG. 12A, the air on the right side in the engine compartment when viewed from the front of the vehicle, flows over the transmission 11, therefore it flows comparatively straight. On the other hand, the air on the left side in the engine compartment when viewed from the front, strikes the engine block 1 and turns around to the left side or below the engine block 1. The fresh air FA comes into the engine compartment through the openings underneath the bumper under each of the headlamps 3 on the right side and 3a on the left side when viewed from front of the vehicle.

As can be seen by the arrows shown in FIG. 11A, the heated air HA flowing through the fan blades of the fans 5 is deflected toward the right when viewed from the front of the vehicle, with the strong influence of the rotational component of the flow velocity behind the fan blades 5, so that most of the air passes through the space over the transmission 11 and part of the air passes through the gap between the engine block 1 and the bonnet of the vehicle, which is not shown in FIG. 11A, the air is warmed up by the heat of the engine block 1, and the heated air HA turns into the intake air port 2 which is located behind the headlamp 3. On the other hand, the fresh air FA comes into the space behind the headlamp 3a in the engine compartment.

As can be seen by the arrows shown in FIG. 1A, the heated air HA flowing through the fan blades 5 is deflected toward the left when viewed from the front of the vehicle, with the strong influence of the rotational component of the flow velocity behind the fan blades 5, so that most of the air passes through the space over the transmission 11 and part of the air passes through the gap between the engine block 1 and the bonnet of the vehicle, which is not shown in FIG. 1A, the air is warmed up by the heat of the engine block 1, and the heated air HA turns into the space behind the headlamp 3a. On the other hand, the fresh air FA comes into the space behind the headlamp 3 in the engine compartment.

In order to verify the results of the computer simulation as explained above, experiments in the same engine compartment using smoke or tafetta to verify the flow of the back wind of the fan blades were carried out, and the same results were obtained. Furthermore, the atmospheric temperatures at different locations in the engine compartment shown in FIGS. 1A and 11A were measured. As a result of this experiment, the temperature around the intake air port 2 shown in FIG. 1A is much lower than that in FIG. 11A, when the engine is operated at low velocity. Hereinafter, experiments to sense the atmospheric temperatures at different locations in the engine compartment will be explained referring to the FIGS. 8 to 10.

Figure 8:
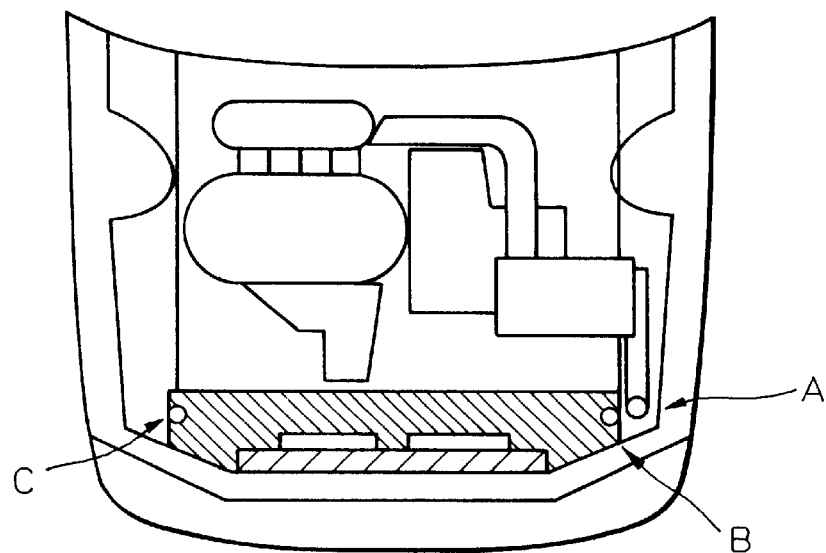
FIG. 8 is a view showing different locations in an engine compartment according to an embodiment of the present invention at which atmospheric temperature is sensed.

FIG. 8 is a view showing different locations in an engine compartment according to an embodiment of the present invention in which atmospheric temperature is sensed. In FIG. 8, A denotes a nose of the air intake port, B denotes space behind the headlamp on the right side in the engine compartment and C denotes space behind the headlamp on the left side in the engine compartment, when viewed from the front side of the vehicle.

Figure 9:
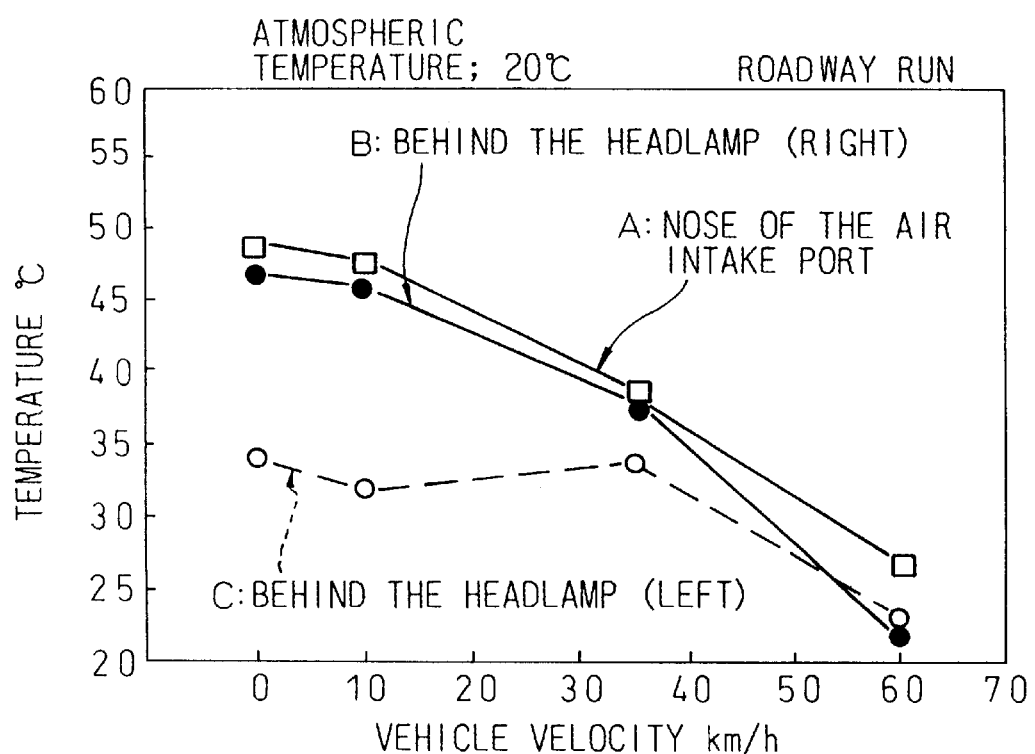
FIG. 9 is a resultant graph showing atmospheric temperature sensed at different locations in an engine compartment changing in response to the vehicle velocity when the rotational direction of the radiator cooling fans is counterclockwise when they are seen from the engine side.
Figure 10:
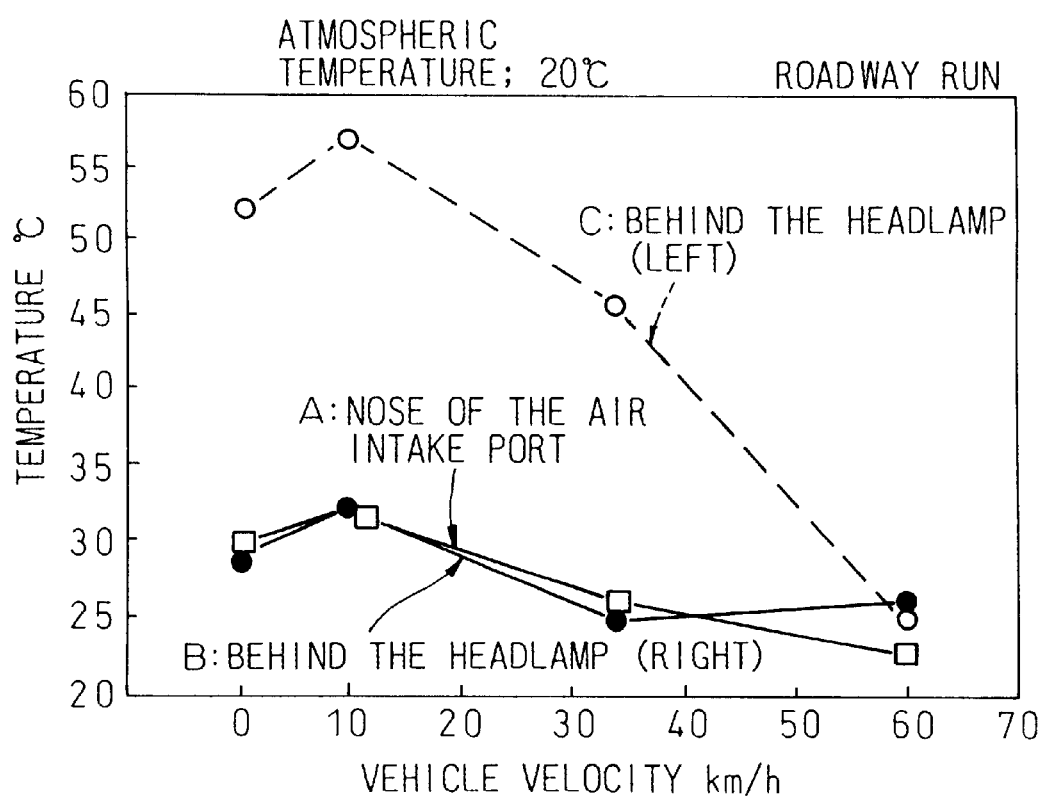
FIG. 10 is a resultant graph showing atmospheric temperature sensed at different locations in an engine compartment changing in response to the vehicle velocity when the rotational direction of the radiator cooling fans is clockwise when they are seen from the engine side.

FIG. 9 and FIG. 10 are graphs showing atmospheric temperature measured at different locations A, B and C shown in FIG. 8 in an engine compartment, changing in response to the vehicle velocity when the rotational directions of the radiator cooling fans are counterclockwise and clockwise respectively, when they are viewed from the engine side. The temperatures were measured when the vehicle was running on a roadway with an ambient temperature of about 20 degrees.

In FIGS. 9 and 10, the abscissa represents the vehicle velocity in km/h, and the ordinate represents the atmospheric temperature in ° C. As shown in FIGS. 9 and 10, the temperatures were measured when the vehicle velocity was 0 km/h, 10 km/h, 35 km/h or 60 km/h at the locations A, B and C in the engine compartment shown in FIG. 8. The marks □, ● and ○ are used for plotting the temperature at the locations A, B and C, respectively. By connecting the marks □ with a solid line, a temperature characteristic curve was created for the location A. By connecting the marks ● with a solid line, another temperature characteristic curve was created for the location B. By connecting the marks ○ with a broken line, another temperature characteristic curve was created for the location C.

As can be seen in FIG. 9, the temperature at A, which is near the nose of the air intake port, and the temperature at B, which is the space behind the headlamp on the right side in the engine compartment, are relatively high when the vehicle velocity is low. On the other hand, as can be seen in FIG. 10, the temperature at A and the temperature at B are very low as compared with those shown in FIG. 9 when the vehicle velocity is low. Namely, as can be seen in FIGS. 8 to 10, the atmospheric temperature around the air intake port according to the structure of the present invention as shown in FIG. 1A is lower than that of the prior art as shown in FIG. 11A when the vehicle velocity is low. Thus, it should be understood that the air filling efficiency to the chambers according to the present invention can be improved as compared with the prior art.

As heretofore explained, according to the structure of the present invention, even though there is no baffle plate, the rotational direction of the cooling fans for the radiator is determined such that the heated air flowing through the cooling fans for the radiator is not introduced into the air intake port, thereby decreasing the temperature of the intake air when the vehicle is idling or at operating at low velocity, improving the air filling efficiency to the chambers, and avoiding the additional cost of a baffle plate and of the assembly man hours.

It will be understood by those skilled in the art that the foregoing description is a preferred embodiment of the disclosed device and that various changes and modifications may be made in the invention without departing from the spirit and scope thereof.

We claim:

1. An engine compartment structure having a front side, a rear side, an air intake side and an air discharge side, wherein an air intake port of an air intake passage of an engine, separate from a grille, is located behind a first headlamp in the engine compartment, an opening of the air intake port is directed toward the front side of the engine compartment, and a rotational direction of one or more radiator cooling fans is determined such that air discharged by the one or more radiator cooling fans is directed away from the location of the air intake port and into contact with a portion of the air discharge side located behind a second headlamp which is opposite to the first headlamp in the engine compartment, wherein the engine compartment structure contains a radiator supported by a radiator support, and the air intake port is located at a position lower than the height of the radiator support.

2. An engine compartment structure according to claim 1, wherein the air intake port is located on a front corner of a left side of the engine compartment and the rotational direction of the one or more radiator cooling fans is clockwise when the air intake port and rotational direction are viewed from the rear side of the engine compartment structure.

3. An engine compartment structure according to claim 1, wherein the air intake port is located on a front corner of a right side of the engine compartment and the rotational direction of the one or more radiator cooling fans is counterclockwise when the air intake port and rotational direction are viewed from the rear side of the engine compartment structure.

4. An engine compartment structure according to claim 1, wherein heated air flowing through the one or more radiator cooling fans is not introduced into the air intake port.

5. An engine compartment structure according to claim 1, wherein the engine compartment structure contains no baffle plates.

6. An engine compartment structure having a front side, a rear side, an air intake side and an air discharge side, wherein an air intake port of an air intake passage of an engine, separate from a grille, is located behind a first headlamp in the engine compartment, an opening of the air intake port is directed toward the front side of the engine compartment, and a rotational direction of one or more radiator cooling fans is determined such that air discharged by the one or more radiator cooling fans is directed away from the location of the air intake port and into contact with a portion of the air discharge side located behind a second headlamp which is opposite to the first headlamp in the engine compartment, and further comprising a radiator support panel, wherein the radiator support panel is located closer to the front side of the engine compartment structure than the opening of the air intake port is located to the front side of the engine compartment structure.

7. An engine compartment structure according to claim 6, wherein the air intake port is located on a front corner of a left side of the engine compartment and the rotational direction of the one or more radiator cooling fans is clockwise when the air intake port and rotational direction are viewed from the rear side of the engine compartment structure.

8. An engine compartment structure according to claim 6, wherein the air intake port is located on a front corner of a right side of the engine compartment and the rotational direction of the one or more radiator cooling fans is counterclockwise when the air intake port and rotational direction are viewed from the rear side of the engine compartment structure.

9. An engine compartment structure according to claim 6, wherein heated air flowing through the one or more radiator cooling fans is not introduced into the air intake port.

10. An engine compartment structure according to claim 6, wherein the engine compartment structure contains no baffle plates.

11. An engine compartment structure according to claim 6, wherein the engine compartment structure contains a radiator supported by a radiator support, and the air intake port is located at a position lower than the height of the radiator support.

12. An engine compartment structure of claim 1, further comprising one or more radiator cooling fans, wherein the radiator cooling fans are located closer to the front side of the engine compartment structure than the opening of the air intake port is located to the front side of the engine compartment structure.

13. An engine compartment structure according to claim 12, wherein the air intake port is located on a front corner of a left side of the engine compartment and the rotational direction of the one or more radiator cooling fans is clockwise when the air intake port and rotational direction are viewed from the rear side of the engine compartment structure.

14. An engine compartment structure according to claim 12, wherein the air intake port is located on a front corner of a right side of the engine compartment and the rotational direction of the one or more radiator cooling fans is counterclockwise when the air intake port and rotational direction are viewed from the rear side of the engine compartment structure.

15. An engine compartment structure according to claim 12, wherein heated air flowing through the one or more radiator cooling fans is not introduced into the air intake port.

16. An engine compartment structure according to claim 12, wherein the engine compartment structure contains no baffle plates.

* * * * *

UNITED STATES PATENT AND TRADEMARK OFFICE
CERTIFICATE OF CORRECTION

PATENT NO. : 6,035,955
DATED : March 14, 2000
INVENTOR(S) : Makoto SUZUKI et al.

It is certified that error appears in the above-identified patent and that said Letters Patent is hereby corrected as shown below:

After [73], please add a new line as follows:

[*] Notice: This patent issued on a continued prosecution application filed under 37 C.F.R. 1.53(d), and is subject to the twenty year patent term provisions of 35 U.S.C. 154(a)(2).

Signed and Sealed this

First Day of May, 2001

Attest:

NICHOLAS P. GODICI

Attesting Officer     Acting Director of the United States Patent and Trademark Office

UNITED STATES PATENT AND TRADEMARK OFFICE
CERTIFICATE OF CORRECTION

PATENT NO. : 6,035,955
DATED : March 14, 2000
INVENTOR(S) : Makoto SUZUKI et al.

It is certified that error appears in the above-identified patent and that said Letters Patent is hereby corrected as shown below:

After [73], please add a new line as follows:

[*] Notice: This patent issued on a continued prosecution application filed under 37 C.F.R. 1.53(d), and is subject to the twenty year patent term provisions of 35 U.S.C. 154(a)(2).

Signed and Sealed this

Twenty-ninth Day of May, 2001

*Attest:*

NICHOLAS P. GODICI

*Attesting Officer*  *Acting Director of the United States Patent and Trademark Office*